United States Patent
Farcy et al.

(10) Patent No.: US 8,424,177 B2
(45) Date of Patent: Apr. 23, 2013

(54) MIM CAPACITOR WITH ENHANCED CAPACITANCE

(75) Inventors: Alexis Farcy, La Ravoire (FR); Maryline Thomas, Asnieres-sur-Seine (FR); Joaquin Torres, Saint Martin le Vinoux (FR); Sonarith Chhun, La Trinité (FR); Laurent-Georges Gosset, Toulouse (FR)

(73) Assignees: STMicroelectronics (Crolles 2) SAS, Crolles (FR); NXP B.V. (Dutch Corporation), Ag Eindhoven (NL)

( * ) Notice: Subject to any disclaimer, the term of this patent is extended or adjusted under 35 U.S.C. 154(b) by 55 days.

(21) Appl. No.: 12/775,103

(22) Filed: May 6, 2010

(65) Prior Publication Data
US 2011/0080686 A1    Apr. 7, 2011

Related U.S. Application Data

(63) Continuation of application No. 12/444,374, filed as application No. PCT/EP2007/060400 on Oct. 1, 2007, now abandoned.

(30) Foreign Application Priority Data

Oct. 4, 2006    (EP) ..................... 06301014

(51) Int. Cl.
*H01G 7/00*    (2006.01)
(52) U.S. Cl.
USPC ........ 29/25.42; 29/25.41; 29/592.1; 361/313; 438/240

(58) Field of Classification Search .......... 29/592.1, 29/832–834, 25.35–25.42, 593; 438/239, 438/396; 361/313, 306.3, 303, 311; 445/24, 445/49–50
See application file for complete search history.

(56) References Cited

U.S. PATENT DOCUMENTS

| | | | | |
|---|---|---|---|---|
| 6,106,913 | A * | 8/2000 | Scardino et al. | 428/36.3 |
| 6,130,143 | A * | 10/2000 | Westwater et al. | 438/478 |
| 6,414,836 | B1 * | 7/2002 | Tennent et al. | 361/313 |
| 6,848,962 | B2 * | 2/2005 | Kitamura et al. | 445/24 |
| 7,034,444 | B2 * | 4/2006 | Tsukamoto | 313/309 |
| 7,056,409 | B2 * | 6/2006 | Dubrow | 156/276 |
| 7,819,718 | B2 * | 10/2010 | Kawate et al. | 445/51 |
| 8,191,217 | B2 * | 6/2012 | Dunn et al. | 29/25.42 |
| 2004/0106203 | A1 | 6/2004 | Stasiak et al. | |

FOREIGN PATENT DOCUMENTS
WO    WO 2005/094440 A    10/2005

OTHER PUBLICATIONS
International Search Report dated Jan. 24, 2008 from International Patent Application No. PCT/EP2007/060400.

* cited by examiner

*Primary Examiner* — Minh Trinh
(74) *Attorney, Agent, or Firm* — Wolf, Greenfield & Sacks, P.C.

(57) ABSTRACT

A method of forming a metal-insulator-metal capacitor having top and bottom plates separated by a dielectric layer, one of the top and bottom plates having at least one protrusion extending into a corresponding cavity in the other of the top and bottom plates, the method including the steps of growing one or more nanofibers on a base surface.

10 Claims, 5 Drawing Sheets

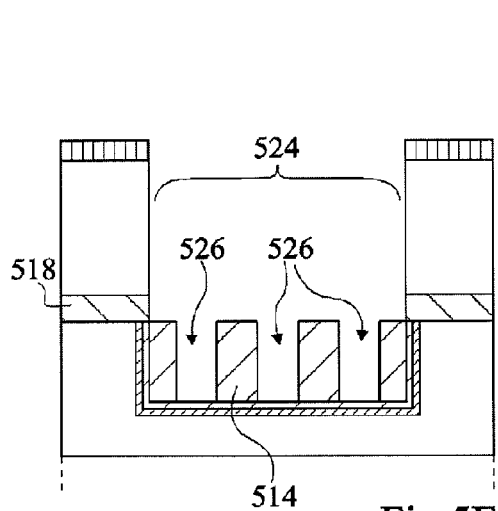
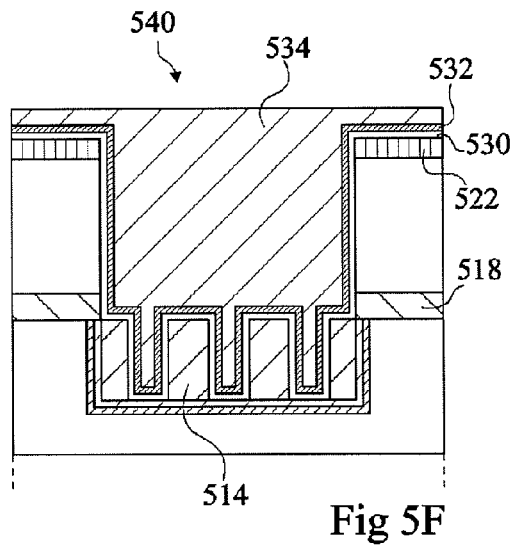
Fig 5E  Fig 5F
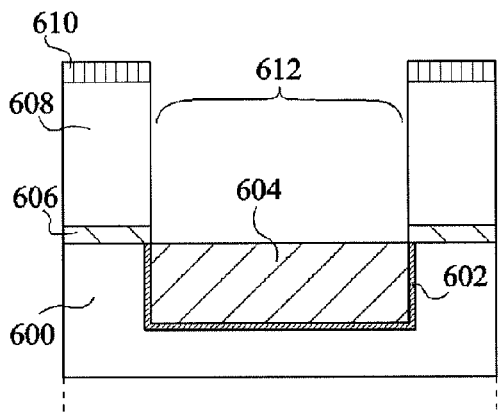
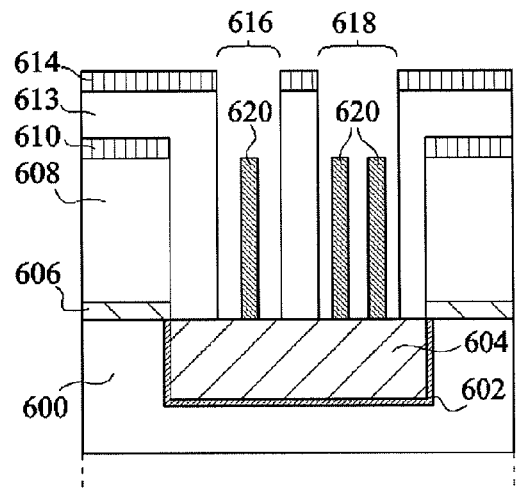
Fig 6A  Fig 6B
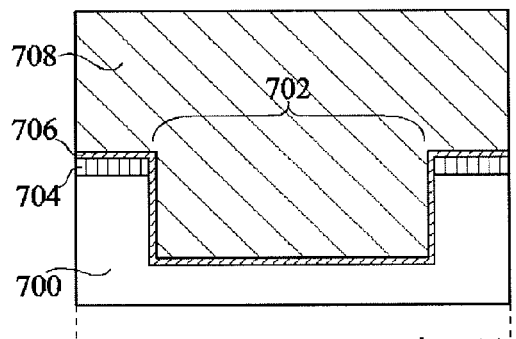
Fig 7A

MIM CAPACITOR WITH ENHANCED CAPACITANCE

CROSS REFERENCE TO RELATED APPLICATIONS

This application is a continuation of U.S. application Ser. No. 12/444,374, filed Apr. 30, 2009 entitled, "MIM Capacitor" which application is a U.S. National Stage of PCT application No. PCT/EP07/60400, filed Oct. 1, 2007, entitled "MIM Capacitor" which application claims the priority benefit of European patent application number 06301014.4, filed on Oct. 4, 2006, entitled "MIM Capacitor" which applications are hereby incorporated by reference to the maximum extent allowable by law.

BACKGROUND OF THE INVENTION

1. Field of the Invention

The present invention relates to metal-insulator-metal (MIM) capacitors, and in particular to MIM capacitors having an improved capacitance.

2. Discussion of the Related Art

MIM capacitors generally comprise two metal plates separated by a layer of a dielectric material. A 3D MIM capacitor is discussed in paper titled High-Capacitance Cu/$Ta_2O_5$/Cu MIM Structure for SoC Applications Featuring a Single-Mask Add-on Process, T. Ishikawa et al., IEDM 2002. This 3D MIM structure comprises a trench in which layers of Ta, $Al_2O_3$, $Ta_2U_5$, $Al_2O_3$, and Ta have been deposited. Such a structure has an increased capacitive surface when compared to classic MIM capacitors and therefore provides an improved capacitance per unit area.

For some applications it would be desirable to provide a process of forming a MIM capacitor having improved capacitance per unit area when compared to conventional MIM capacitors or to the above-mentioned 3D MIM capacitor.

SUMMARY OF THE INVENTION

One aim of the present invention is to provide an improved MIM capacitor and method of forming the same.

According to a first aspect of the present invention, there is provided a method of forming a metal-insulator-metal capacitor having top and bottom plates separated by a dielectric layer, one of said top and bottom plates having a form comprising at least one protrusion extending into a corresponding cavity in the other of said top and bottom plates, the method comprising growing at least one nanofiber on a base surface; and forming one of said top and bottom plates such that the diameter of said at least one protrusion is determined by the diameter of said at least one nanofiber.

According to one embodiment of the present invention, the at least one protrusion comprises one of the nanofibers.

According to a further embodiment of the present invention, after growing the nanofiber, the method comprises coating the nanofiber with a metallic layer and subsequently coating the metallic layer with a dielectric layer.

According to a further embodiment of the present invention, after growing at least one nanofiber, further comprising depositing a first layer of a material over said surface, selectively removing the nanofiber such that at least one hole remains in said first layer, and forming the protrusion in the hole.

The holes, for example, have a diameter of less than 50 nm. According to a further embodiment of the present invention, the first layer is of a conducting material, and the nanofiber is removed using an etch.

According to yet a further aspect of the present invention, the nanofiber is a carbon nanofiber and the base surface comprises at least one of nickel and cobalt.

According to yet a further embodiment, the method further comprises, before growing the nanofibers, depositing catalytic particles over the base surface, the particles providing a starting point for subsequent nanofiber growth. According to a further embodiment of the present invention, before growing the nanofibers, the method comprises depositing a layer of sacrificial material over the base surface, and etching a plurality of holes in the sacrificial material down to the base surface, the nanofibers being grown on the base surface in the plurality of holes.

According to some embodiments of the present invention the nanofibers comprise carbon nanofibers having a diameter of less than 50 nm, and the protrusions have a diameter of less than 40 nm.

According to a further aspect of the present invention, there is provided a metal-insulator-metal capacitor comprising top and bottom plates separated by a dielectric layer, one of the top and bottom plates comprising at least one protrusion extending into a corresponding cavity in the other of the top and bottom plates, the cavity formed by removal of a nanofiber.

According to yet a further aspect of the present invention, there is provided a metal-insulator-metal capacitor comprising top and bottom plates separated by a dielectric layer, one of the top and bottom plates comprising at least one protrusion extending into a corresponding cavity in the other of the top and bottom plates, the protrusion comprising a nanofiber.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings.

FIGS. 5A to 5F are cross-section views illustrating steps for forming a MIM capacitor according to a further embodiment of the present invention;

FIGS. 6A and 6B illustrate alternative steps for forming nanofibers according to embodiments of the present invention; and FIGS. 7A to 7G are cross-section views illustrating steps in forming a MIM capacitor according to yet a further embodiment of the present invention.

The figures have not been drawn to scale, and often certain dimensions have been enhanced to aid clarity.

DETAILED DESCRIPTION

Figure 1:
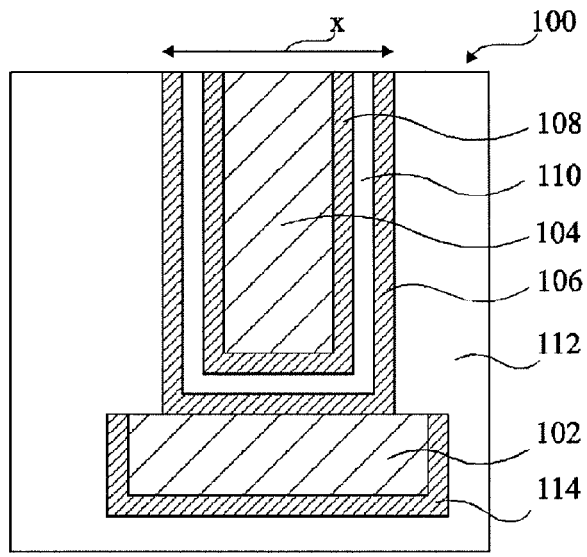
FIG. 1 illustrates an example of a 3D MIM capacitor.

FIG. 1 is a cross-section view of an example of a 3-dimensional MIM capacitor 100. 3D MIM capacitor 100 comprises bottom and top electrodes 102, 104 in contact with respective top and bottom plates 106, 108 of the capacitor. Plates 106, 108 are formed of metallic layers and are separated from each other by a dielectric layer 110 preferably formed of a high k material. In order to form the bottom electrode 102 and plate 106, a trench is formed in a silicon dioxide layer 112, and lined with a metallic barrier 114 before being filled with copper. CMP (chemical and mechanical polishing) is then performed to remove excess material. A further silicon dioxide layer is then applied, in which a second trench is formed. The second trench is lined with a metallic layer to form the bottom plate 106 of the capacitor, in contact with the bottom electrode 102. The dielectric layer 110 of high k material is then applied, and a further metal layer is deposited covering the dielectric layer 110, to form the top plate 108 of the capacitor. The second trench is then filled with copper to form the top electrode 104, and again CMP is performed to remove excess material.

The capacitance of capacitor 100 is a function of the capacitive surface area of the capacitor, and the dielectric permittivity and thickness of the dielectric layer 110. The capacitive surface area is equal to the surface areas of the top and bottom plates 106, 108 that face each other, and in this embodiment this includes both the horizontal portions of these plates, as well as the vertical side portions of these plates, and thus this type of capacitor is called a 3D capacitor. A typical capacitance value for a 3D MIM capacitor having top and bottom plates 300 nm in height is from 3 to 15 fF/$\mu m^2$, depending on the high k material used for the dielectric layer 110 and the thickness of the dielectric layer 110.

In order to further increase the capacitance of the 3D MIM capacitor described above, one solution would be to provide further adjacent trenches over the bottom electrode 102, each comprising a similar bottom plate 106, dielectric layer 110 and top plate 108 as described above, and separated by a gap. The space available for capacitors in semiconductor circuits is generally restricted, and therefore if the capacitance is to be increased without increasing the chip surface area of the capacitor, the width x (indicated in FIG. 1) of the trenches needs to be reduced at the same time as providing further trenches, and/or the spacing between such trenches also needs to be reduced. In such a 3D MIM capacitor, the vertical sides provide the largest proportion of capacitive surface area, and thus by increasing the number of vertical sides in a given area, the capacitance can be increased. However, the current technology used for forming trenches in silicon devices, such as photo-etching, makes it difficult to reduce the minimum trench width, and the minimum spacing between trenches.

Figure 2A:
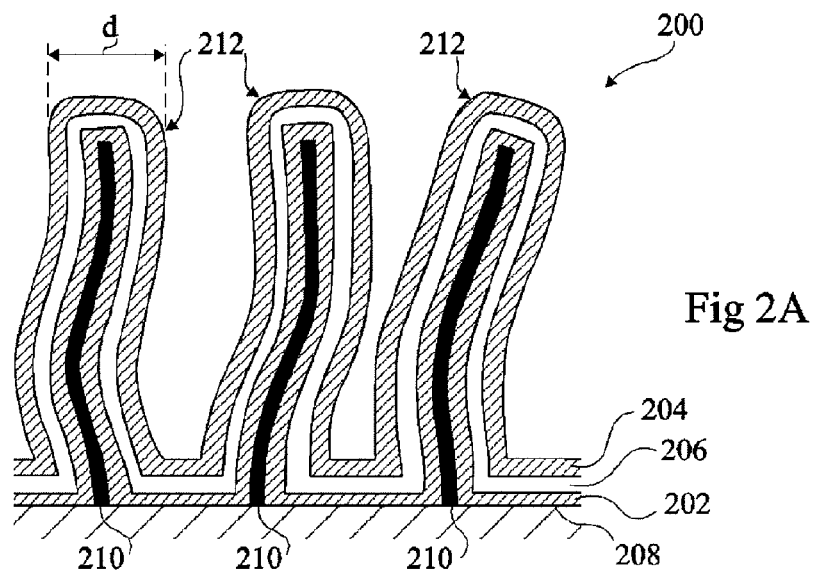
FIGS. 2A and 2B are cross-sectional views illustrating MIM capacitors according to embodiments of the present invention.

FIG. 2A illustrates an embodiment of the present invention in which a 3D MIM capacitor 200 comprises a bottom plate 202 formed of a layer of conducting material and a top plate 204 also formed of a layer of conducting material, the top and bottom plates 202, 204 separated by a dielectric layer 206, preferably formed of a high k material. These layers coat a surface 208 on which a number of nanofibers 210 have been grown.

The nanofibers 210 and the bottom plate 202 thus form protrusions extending into the corresponding form of the top plate 204. Nanofibers 210 have a diameter of, for example, between 5 and 40 nm, and a height of for example 300 nm. Assuming a nanofiber diameter of 5 nm, a metal layer thickness of 2 nm for each metal layer 202, 204, and a dielectric layer thickness of for example 2 nm, the overall diameter d of each vertical column 212 comprising the bottom and top plates 202, 204 and the dielectric layer 206 is for example equal to 17 nm. However, by providing different diameter nanofibers, and different metal and dielectric layer thickness, the overall diameter of each column 212 could be for example between 10 and 50 nm.

The nanofibers 210 can be grown having a high density, each for example being separated from the next by between 10 and 50 nm. Thus once the metal layer 202, the dielectric layer 206 and the metal layer 204 have been deposited, the metal layer 204 covering one protrusion can be almost touching the metal layer 204 covering an adjacent protrusion. Although not shown in FIG. 2A, preferably a further layer of conducting material such as copper is deposited over the metal layer 204, covering all of the columns 212, and providing a top electrode of the device.

Nanofibers 210 can be conducting, non-conducting or semi-conducting. If nanofibers 210 are formed that are conducting, and formed on surface 210 of a conducting material, the nanofibers 210 and surface 208 can provide the bottom plate of the capacitor without the need of metal layer 202. The dielectric layer 206 can then be formed directly over surface 208 and the nanofibers 210, and one less metal deposition step is then required for forming the capacitor.

Surface 208 is for example the surface of a conducting material forming a bottom electrode for the bottom capacitor plate 202.

Figure 2B:
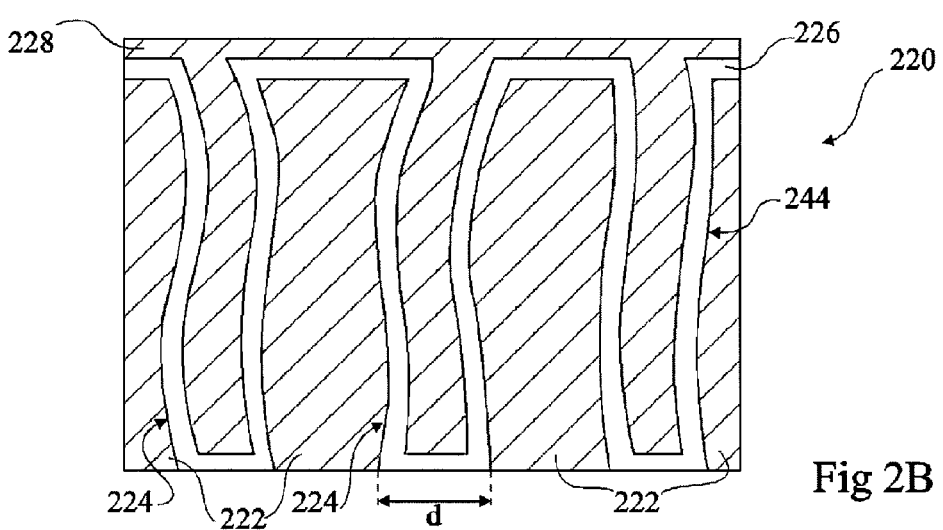

FIG. 2B illustrates a further embodiment of the present invention in which a 3D MIM capacitor 220 comprises a layer 222 of a conducting material having a number of holes 224 formed in it. Holes 224 have been formed by filling the space between a number of nanofibers with the layer 222, and then removing the nanofibers, for example using a suitable etch. The nanofibers are thus used as a sacrificial material in this embodiment. The holes are then lined with a dielectric layer 226 preferably formed of a high k material. A further layer 228 of conducting material is deposited filling holes 224.

The nanofibers used for forming holes 224 are for example between 10 and 50 nm in diameter, and therefore holes 224 also have a diameter d of between 10 and 50 nm. Furthermore, the nanofibers can be grown very densely such that the holes 224 are very close together, for example between 5 and 50 nm apart.

Thus as illustrated by FIGS. 2A and 2B, by using nanofibers in the process for forming 3D MIM capacitors, vertical capacitive surface area can be provided much more densely than is possible using trenches formed using other known techniques. This is because by using nanofibers, very low diameter protrusions can be formed extending from one plate into the other plate, and furthermore protrusions can be formed very close together. Thus the capacitive surface area of the device for a particular area on chip can be increased when compared to that of devices formed by previously known techniques.

FIGS. 3A to 3E illustrate steps in an exemplary method for forming a 3D MIM capacitor having a structure similar to that shown in FIG. 2A. In particular, capacitance per unit area is increased by adding a further surface topology using nanofibers that increase the capacitive surface area of the device without increasing the surface on chip.

Figure 3A:
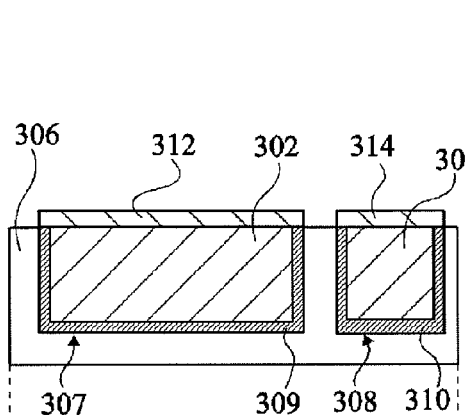
FIGS. 3A to 3E are cross-sectional views illustrating steps in a process for making a MIM capacitor according to a further embodiment of the present invention.

FIG. 3A illustrates first steps in which a bottom electrode 302 and a line 304 are formed, for example in the fifth metallization (M5) layer of a semiconductor device. A silicon dioxide layer 306, for example having a depth of approximately 300 nm, is provided in which trenches 307, 308 are etched for the electrode 302 and line 304 respectively. Trenches 307, 308 are then lined with a metal layer to form metallic barriers 309 and 310 for the electrode 302 and line 304 respectively. Trench 307 is, for example, 14 µm wide, and trench 308 is for example 5 µm wide. Trenches 307, 308 are then filled with metal, in this example copper, and excess copper is removed by CMP (chemical mechanical polishing) to provide a relatively flat top surface level with the top of trenches 307, 308. Conducting self-aligned barriers 312, 314 are then formed over the copper electrode 302 and copper line 304. Barriers 312, 314 for example comprise one of CoWP, CoWB, CoWPB and NiMoP. In particular, the material of these barriers 312, 314 is chosen to facilitate growth of nanofibers such as carbon nanotubes, as will be explained in more detail below. The self-aligned barriers 312, 314 are for example formed by electroless deposition, and may be formed covering the top edges of barriers 309, 310 as illustrated in FIG. 3A, or can alternatively cover the whole of the top surface of insulating layer 306, or only the copper electrode 302 and line 304.

Figure 3B:
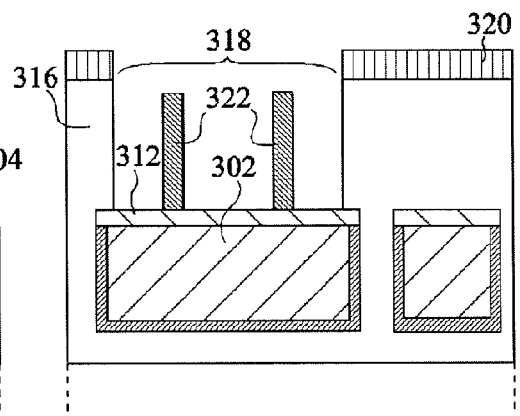

FIG. 3B illustrates the subsequent steps in which a further silicon dioxide layer 316 is formed over layer 306. A trench 318 is then etched in this layer 316, over the electrode 302, using a hard mask 320. Trench 318 is aligned with electrode 302, and extends down to the level of the upper surface of barrier 312. As shown in FIG. 3B, a number of nanofibers 322, which are for example carbon nanofibers, are then grown on the exposed surface of barrier 312. Two such nanofibers 322 are illustrated.

Processes for growing nanofibers, in particular carbon nanofibers/nanotubes, are for example discussed in the paper titled "Novel approach to fabricating carbon nanotube via interconnects using size-controlled catalyst nanoparticles", Shintaro Sato et al., IEEE 2006, and in the paper titled "Template Synthesis of Carbon Nanotubes from Porous Alumina Matrix on silicon dioxide", R. Gras et al., these documents being hereby incorporated by reference to the extend allowable by the law.

In the following description, the term "nanofibers" will generally be used to designate fibers having a diameter of less than 50 nm, such as carbon nanotubes. To achieve the growth of carbon nanofibers, the silicon dioxide device is for example placed in a CVD (chemical vapor deposition) chamber containing a mixture of $C_2H_2$ and Ar. The material selected for the self-aligned barrier in the present embodiment not only provides a surface on which carbon nanofibers grow, but also acts as a growth catalyst. In particular, the self-aligned barrier contains particles of cobalt or nickel, and from these particles individual crystalline nanofibers grow. It has been found by the present applicant that in this process the carbon nanofiber growth tends to be evenly dispersed over the growing surface.

The process of forming carbon nanofibers 322 allows characteristics of these structures to be determined, for example their density, height, diameter, and structure, and whether or not the fibers remain as solid cylindrical columns, or whether they form hollow tubes. In particular, longer or shorter growing times, different gases, different growing temperatures etc. can be used to provide the required carbon nanofiber growth. In the present example the carbon nanofibers are grown such that they reach a height that is less than the depth of the trench 318, and for example they extend approximately two-thirds of the way up the trench 318, having a height of approximately 200 nm. Carbon nanofibers can be formed that are conducting, semi-conducting, or insulating, and in embodiments described herein any of these types of structures could be used.

The nanofibers 322 are for example grown to have a diameter of between 5 and 50 nm. In the present example they are grown as solid columns, however in alternative embodiments tubes could be grown. They are for example spaced between 50 and 500 nm apart, their density being controllable by the growing process. Thus while only two fibers 322 have been illustrated in trench 318, which is 14 µm wide in this example, in practice there could be in the range of twenty and two hundred nanofibers across this width.

Figure 3C:
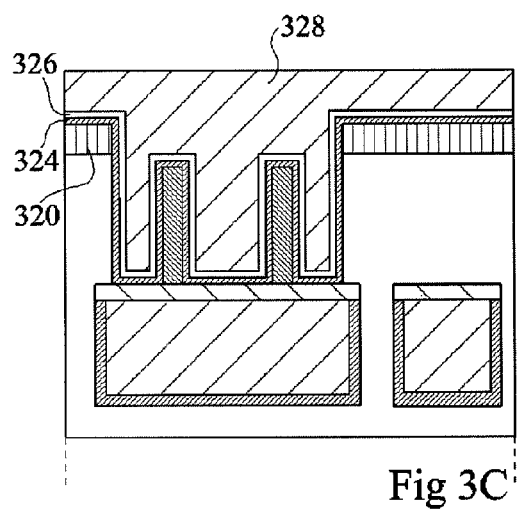

FIG. 3C illustrates next steps in the process in which a layer of metal is deposited to form a metallic barrier 324 lining the trench, and covering the nanofibers 322. Metallic barrier 324 is for example formed of titanium nitride (TiN), applied by an ALD (atomic layer deposition) process, and has a thickness of between 1 and 5 nm. Metal barrier 324 thus forms the bottom plate of the capacitor. Then a layer of material, preferably having a high k value is deposited, forming a dielectric layer 326 over the metallic barrier 324. For example, the dielectric layer is formed using metal oxide chemical vapor deposition (MOCVD), or plasma enhanced atomic layer deposition (PEALD), and for example comprises silicon dioxide ($SiO_2$). Dielectric layer 326 has a thickness that depends on the required characteristics of the MIM capacitor, and, for example, has a thickness of between 1 and 50 nm. Trench 318 is then filled with copper, thus forming a top plate 328 of the capacitor, as well as a top electrode. In alternative embodiments a further metal layer is provided between the dielectric layer 326 and the copper layer 328 to provide a metallic barrier preventing copper diffusion.

Figure 3D:
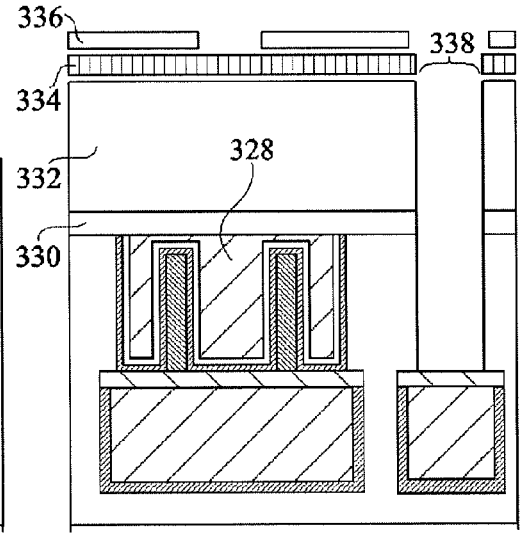

FIG. 3D illustrates next steps in which a further layer of the device is formed, this layer comprising the vias necessary to connect to line 304 and top electrode 328. Firstly, the excess copper deposited in the previous step is removed using CMP, to provide a flat top surface flush with the top of trench 318. A thin layer 330 of low k material is then deposited over the top surface, forming a dielectric barrier 330 covering the top surface of the electrode 328. A layer 332 of low k material is then deposited over the dielectric barrier 330, forming a further insulating layer 332 of the device, which is for example 300 nm thick. A dual hard mask 334, 336 is then deposited over the insulating layer 332, mask 334 having an opening aligned with a region on the top of line 304, and mask 336 having a first opening aligned with the top of line 304, and second opening aligned with the top surface of electrode 328. In a first etching step, a line etch is applied which does not penetrate mask 334, but penetrates in the region of line 304, and bores a hole 338 down to the metallic barrier 314 formed over the line 304, as illustrated in FIG. 3D.

Figure 3E:
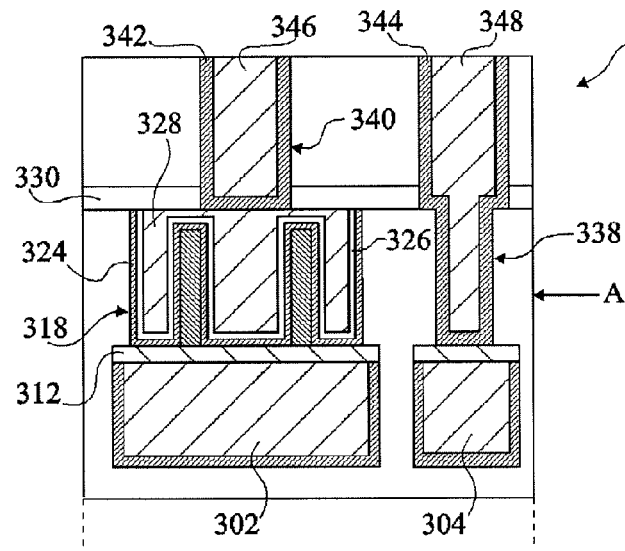

FIG. 3E illustrates subsequent steps in which a further etch is performed that penetrates mask 334 and creates a channel 340 down to the top surface of electrode 328, and enlarges the hole 338 in the region down to dielectric barrier 330. Both trenches 338, 340 are then lined with a metal layer to form metallic barriers 342, 344 respectively, and then the trenches 338, 340 are filled with copper to form the top electrode via 346 and line via 348. Although not shown in FIG. 3E, line 304 is preferably connected to the bottom electrode 302, and thus line via 348 provides a means for making a connection with the bottom electrode 302.

Thus as shown in FIG. 3E, a MIM capacitor 350 has been formed comprising a bottom plate 324 having protrusions where this plate covers a series of nanofibers extending upwards into corresponding openings in a top plate 328. Thus the capacitive surface area between the top and bottom plates 324, 328 comprises the surface area of the top and sides of the bottom plate 324 covering nanofibers. When compared to the standard 3D MIM capacitor of FIG. 1, the additional topology added by the nanofibers greatly increases the capacitive surface area of the MIM capacitor 350.

In alternative embodiments, no metallic barrier 324 can be deposited, and the dielectric layer 326 is deposited directly over the nanofibers. Thus one less metal deposition is required. In this case the nanofibers 322 form the bottom plate of the capacitor and are formed of a conducting material.

Figure 4:
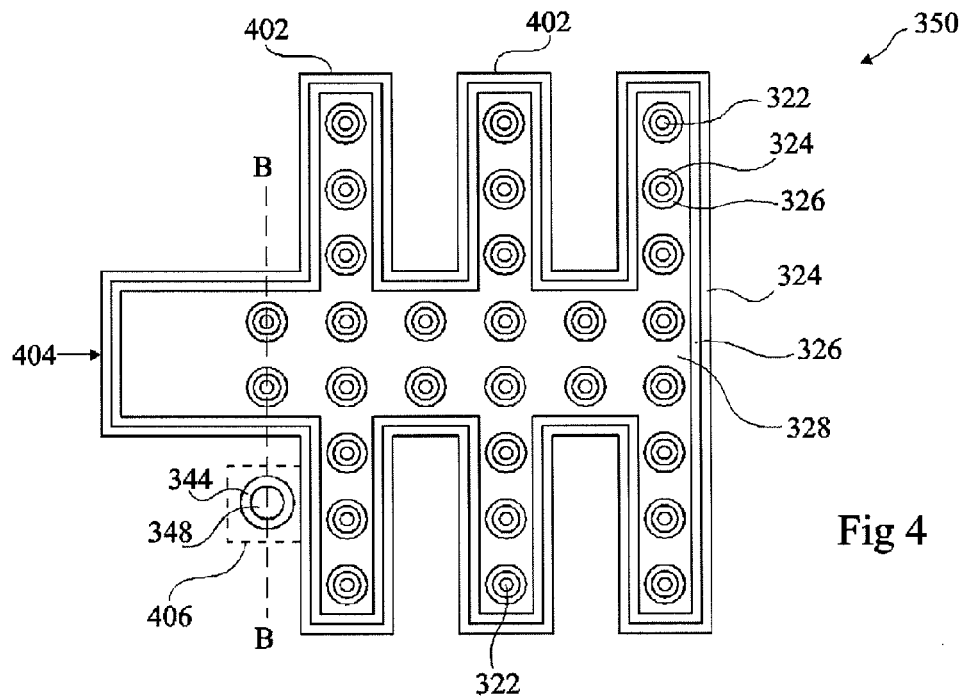
FIG. 4 is a plan view of a cross section of a MIM capacitor according to the embodiment of the present invention of FIGS. 3A to 3E.

FIG. 4 illustrates a cross-section plan view of the MIM capacitor 350 formed by the steps of FIGS. 3A to 3E, the cross-section being taken at the level marked 'A' in FIG. 3E. As shown in FIG. 4, the capacitor 350, for example, has a shape comprising a number of fingers 402 connected by a main channel 404. Each of the fingers 402, and the main channel 404 comprise nanofibers 322 formed at regular intervals throughout. The nanofibers 322 are surrounded by metal layer 324 forming the bottom plate of the capacitor, and then by dielectric layer 326. Copper layer 328 is shown filling the space between the nanofibers 322.

Again, while for clarity only a few nanofibers 322 have been illustrated in the figure, in practice many more nanofibers may be provided.

The dashed line B-B in FIG. 4 shows the cross-section represented in FIG. 3E, which passes through via 348. As explained above, line 304 is connected to the bottom electrode of the device in a lower level to the level shown in FIG. 4, however the form of this line is shown by dashed line 406.

FIGS. 5A to 5F illustrate steps in a further exemplary method for forming a MIM capacitor having improved capacitance per unit volume when compared to those of the prior art. Again a modified topology is used to increase the capacitive surface area of the device, and in this embodiment nanofibers are used as a sacrificial material during the formation of the capacitor electrodes, to provide a MIM capacitor that is similar to that of FIG. 2B.

Figure 5A:
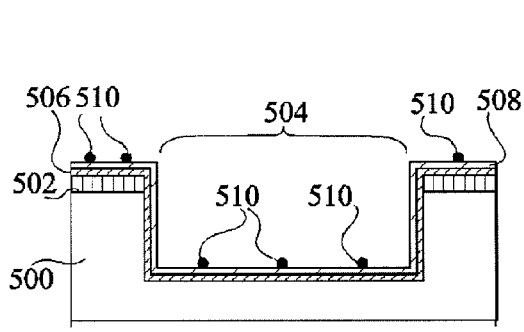

FIG. 5A illustrates first steps in which a layer 500 of low k material such as silicon dioxide is formed in, for example, the fifth metallization level (M5) of a semiconductor device. Using a hard mask 502, a trench 504 having a depth for example of 250 nm is formed. A metal layer is then deposited to form a metallic barrier 506 lining the trench and the top surface of the mask. Metallic barrier 506 for example comprises titanium nitride (TiN) deposited by an ALD process, and is between 1 and 5 nm thick. A copper seed layer 508 is then formed over the metallic layer 506, for example by PVD, again lining the trench 504. This layer 508 provides a surface suitable for growth of a carbon nanofiber, and aids the deposition of a subsequent copper layer as described below. Next, a number of cobalt catalytic particles 510 are deposited evenly over the copper seed layer 508, these particles forming a starting point for carbon nanofiber growth. These particles, for example, have an average diameter of 4 nm, and are for example deposited by spray deposition, target pulverization or by using a particle beam. In alternative embodiments particles of nickel could be used instead of cobalt particles.

Figure 5B:
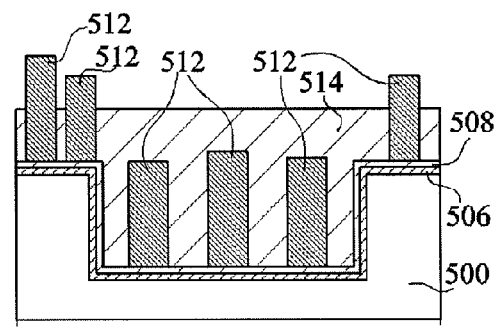

FIG. 5B illustrates next steps in the method in which nanofibers 512 are grown starting from the catalytic particles. The growth of these nanofibers 512 can be controlled in the same way as described above in relation to FIG. 3B, to achieve a required structure, diameter and height. The density of nanofibers in this embodiment is determined by the density of catalytic particles deposited in the previous step. In this example nanofibers 512 are grown having an average diameter of between 20 and 50 nm. Again, while for clarity only a few nanofibers 512 have been illustrated, in practice there may be tens, hundreds or thousands of nanofibers grown in the depicted region. As the catalytic particles 510 were deposited over the whole surface of the seed layer 508, both in the trench 504 and outside the trench 504, the nanofibers 512 grow both within and around the trench 504. The nanofibers are grown to a height such that those grown from the bottom of the trench 504 preferably extend at least to the level of the top of the trench 504. A layer 514 of metal such as copper is then deposited, filling the trench 504, and surrounding the nanofibers 512.

Figure 5C:
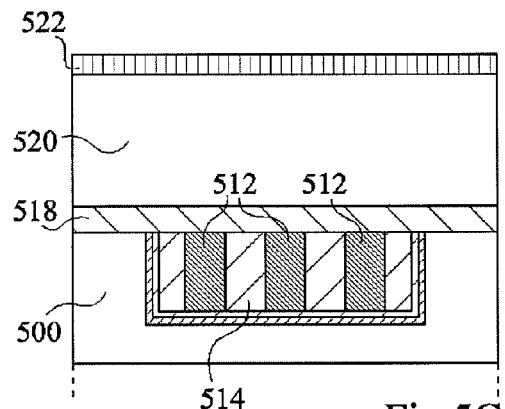

FIG. 5C illustrates subsequent steps in the method in which CMP is performed such that the top surface of the device is flush with the top of the trench 504. Thus nanofibers formed outside the trench are removed, and those in the trench have their tops removed such that they are flush with the top of the trench 504. Copper only remains in the trench 504 between the nanofibers. A dielectric barrier 518 is then deposited over the surface, a further insulating layer 520 is deposited, for example having a thickness of 300 nm, and a hard mask 522 is formed over the insulating layer 520.

Figure 5D:
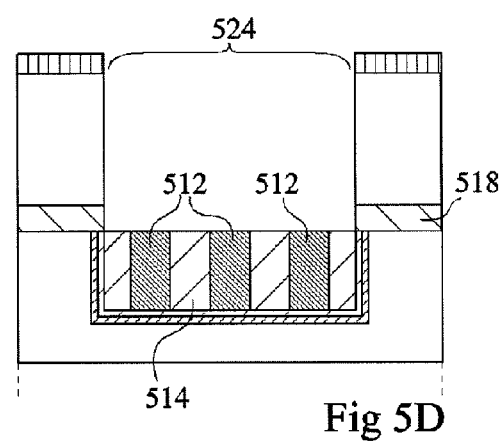

FIG. 5D illustrates next steps in which photolithography and etching are performed, aligned with the top surface of trench 504, to form a trench 524 down to top surface of the copper 514 and nanofibers 512.

FIG. 5E illustrates a subsequent step in which an etching process is performed using an etch that selectively removes the nanofibers 512, leaving the copper layer 514 between the nanofibers 512 such that it has a number of cavities 526 of the same dimensions as the nanofibers. For example, oxygen or hydrogen based dry chemistry can be used for performing the selective etch.

FIG. 5F illustrates next steps in which a dielectric layer 530 is deposited, for example using PEALD (plasma enhanced atomic layer deposition), lining the trench 524 and the cavities 526. Dielectric layer 530 is for example formed of a high k material such as silicon nitride and has a thickness of between 1 nm and 50 nm. A metal layer is then deposited over the dielectric layer 530, forming a metallic barrier 532. Metallic barrier 532 is for example formed of titanium nitride (TiN), and has a thickness of between 2 nm and 10 nm. A copper layer 534 is then deposited filling the trench 524 and the remaining unfilled volumes of cavities 526, and forming the top electrode of the MIM capacitor. In alternative embodiments, in the case that holes 526 are too narrow to allow a copper deposition, only TiN fills these holes.

CMP can be used to remove the top layer of the device down to the bottom of the hard mask layer 522, providing a flat top surface ready for a subsequent layer of vias or interconnections to the device.

The resulting MIM capacitor 540 thus has a top plate 532 comprising protrusions that extend into the cavities in the bottom plate 514, the cavities being left by removal of nanofibers. The dimensions of the protrusions of the top electrode 534, and of the cavities in the bottom electrode 514 are determined by the diameter of the nanofibers, and also the thickness of the dielectric layer. Assuming that the dielectric layer 530 is 5 nm thick, and the metallic barrier 532 2 nm thick, the cavities left by the nanofibers are for example 20 nm or more in width such that copper is able to fill the cavities after the metallic barrier and dielectric layer have been deposited, or alternatively narrower if only the dielectric layer 530 and the metallic barrier 532 are to fill these holes.

In alternative embodiments, an additional metal layer could be deposited lining trench 524 before the dielectric layer is deposited. This layer would then form the bottom plate of the electrode, and would increase the capacitance of the device by providing further capacitive surface area at the sides of trench 524.

While not illustrated, in plan view the capacitor 540, for example, has a shape which is the same as the shape shown in FIG. 4 for capacitor 350.

FIGS. 6A and 6B illustrate alternative initial steps in the method of FIGS. 3A to 3F. In particular, rather than growing nanofibers on a metallic barrier, as described above in relation to FIG. 3B, according to the embodiment of FIGS. 6A and 6B, nanofibers are grown directly on the top surface of the bottom electrode in holes in a sacrificial material.

By growing nanofibers in etched holes, their density and growth can be more accurately controlled. In particular, it is easier to control their growth such that they grow straight upwards.

FIG. 6A illustrates first steps in which, in a similar fashion to the method of FIG. 3A, a trench is formed in a silicon dioxide layer 600, a metallic barrier 602 is provided lining the trench, and the trench filled with copper to form a bottom electrode 604 of a MIM capacitor. A dielectric barrier 606, a further silicon dioxide layer 608 and a hard mask 610 are then deposited. Dielectric layer 602 acts as an etch stop layer for a subsequent etching step in which a trench 612 is etched, aligned with the bottom electrode 606, and extends to the surface of bottom electrode 606.

FIG. 6B illustrates next steps in which a sacrificial material layer 613, such as SiLK (silicon low k, for example from the Dow Chemical Company) or a thermally degradable polymer, is deposited filling trench 612, and a further hard mask 614 is deposited over layer 613. Trenches 616, 618 are then etched in silicon dioxide layer 613, trenches 616, 618 being aligned with bottom electrode 604, and extending down to the top surface of electrode 604. Nanofibers 620 are then grown in trenches 616, 618, in a manner as described in more detail above. One or more nanofibers (620) are then grown in each trench. As with the embodiment of FIGS. 3A to 3F, the nanofibers are grown to height lower than the top of trench 612, and assuming trench 612 is 300 nm deep, they are for example grown to a height of 200 nm. Nanofibers 620 for example have a diameter of between 5 and 50 nm.

Sacrificial layer 613 is then removed, for example using $N_2O_2$ if the layer is formed of SiLK, or using a thermal treatment to remove thermally degradable polymer. A dielectric layer and top electrode of the MIM capacitor can then be formed according to the steps described above in relation to FIGS. 3C to 3E.

FIGS. 7A to 7G illustrate steps of a method of forming a MIM capacitor having a similar structure to the MIM capacitor of FIG. 2A, in which nanofibers are grown in holes formed in a sacrificial material.

FIG. 7A illustrates a silicon dioxide layer 700, formed in for example the fifth metallization layer (M5) of a silicon dioxide device, in which a trench 702 is etched using a hard mask layer 704. A metal layer is then been deposited to form a metallic barrier 706, lining the trench 702 and the top surface of the hard mask 704. The metallic barrier 706 is covered by a layer of a sacrificial material, for example comprising SiLK (Low K Silicon) or a thermally degradable polymer, deposited in a thickness of 400 nm for example.

Figure 7B:
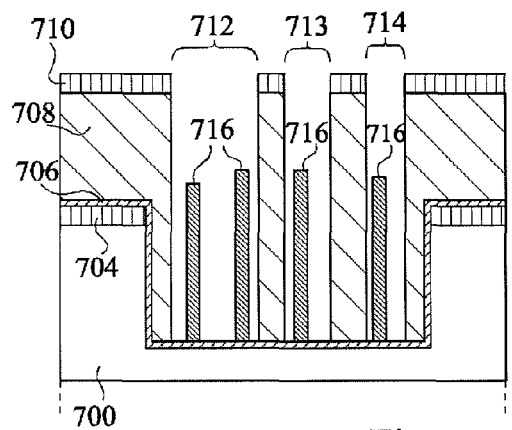

FIG. 7B illustrates subsequent steps in which a number of holes 712, 713, 714 are etched in the sacrificial layer 708, down to the metal barrier 706 at the bottom of trench 702. A number of carbon nanofibers 716 are then grown in each of the holes 712-714.

Figure 7C:
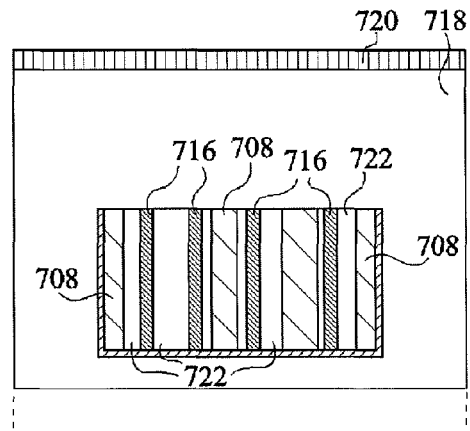

FIG. 7C illustrates subsequent steps in which CMP is then performed, removing the material extending above the top level of the trench. A further silicon dioxide layer 718 is then formed, and a hard mask 720 formed over the silicon dioxide layer 718. As shown, gaps between the nanofibers 716 and the sacrificial material 708 are relatively small, and therefore in this example silicon dioxide from layer 718 does not enter these gaps, and leaves voids 722. In alternative embodiments some silicon dioxide may fill these gaps.

Figure 7D:
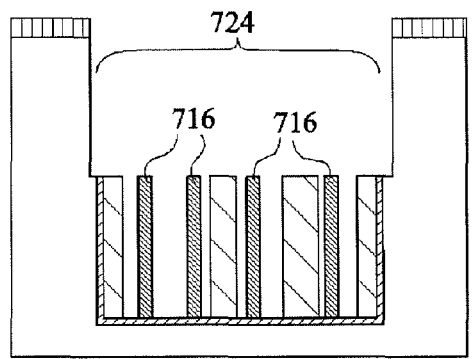

FIG. 7D illustrates a subsequent step in which a trench 724 is etched in silicon dioxide layer 718 aligned with and extending down to the level of the nanofibers 716, and sacrificial material 708. In this step, in the case that silicon dioxide entered the gaps between the nanofibers 716 and sacrificial material 708, this can also be removed.

Figure 7E:
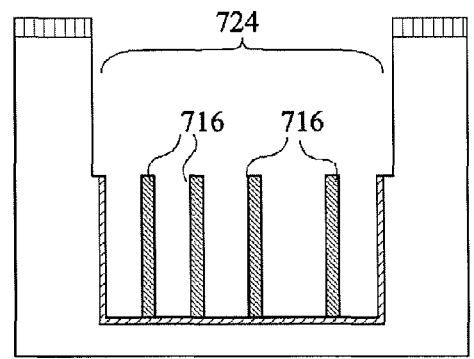

FIG. 7E illustrates a subsequent step in which a further etch is performed for selectively removing the sacrificial material 708, for example using $N_2O_2$ if the sacrificial material 708 is formed of SiLK, or using a thermal treatment if it is formed of thermally degradable polymer.

Figure 7F:
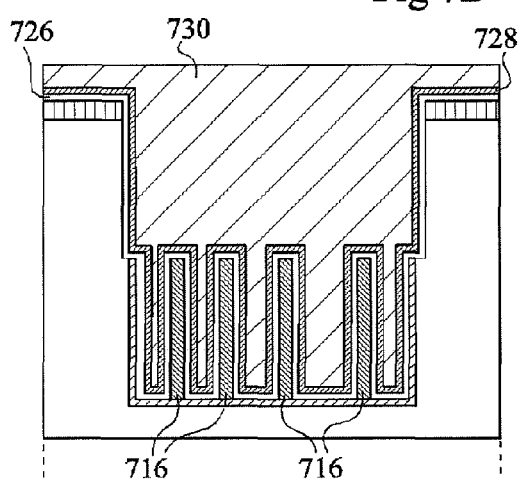

FIG. 7F illustrates subsequent steps in which a dielectric layer 726 is deposited, lining trench 724 and coating nanofibers. A metal layer is then deposited over the dielectric layer, forming a metallic barrier 728 which provides the top plate of the device, before the trench 724 is filled with copper 730 to form the top electrode.

Figure 7G:
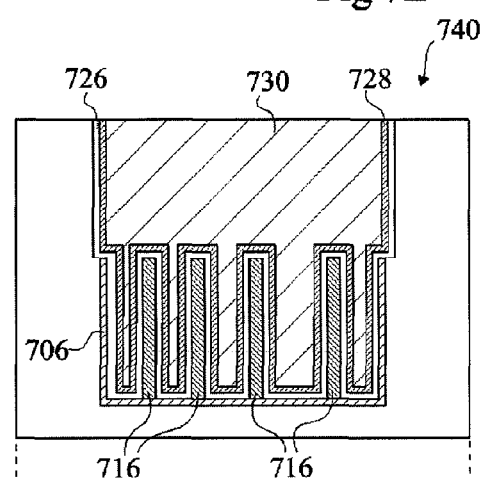

FIG. 7G illustrates the resulting MIM capacitor 740 after CMP has been used to remove excess material. As illustrated, the bottom plate of the capacitor in this embodiment comprises metal barrier 706 and nanofibers 716.

Thus the formation of MIM capacitors has been described in which nanofibers are used to increase the capacitive surface area between the top and bottom plates of the capacitor. In particular, one of the plates comprises protrusions, and the other corresponding cavities receiving the protrusions. The protrusions have a dimension determined by the diameter of nanofibers grown during formation of these plates.

Advantageously, according to the embodiments described above in relation to FIGS. 3A to 3E and 5A to 5F, no additional hard mask is required when compared to standard 3D MIM capacitor formation. Furthermore, according to the embodiments described in relation to FIGS. 5A to 5F, and 7A to 7G, the height of the nanofibers is made uniform by a CMP step, and the nanofibers extend the whole depth of the bottom electrode, maximizing their height.

Advantageously, the MIM capacitor of FIG. 7G comprises only a metallic barrier 706 and nanofibers 716 forming the bottom plate and electrode of the capacitor, and therefore no separate copper deposition step is required for forming the bottom electrode.

The nanofibers can remain in the capacitor after its formation, as shown in the embodiment of FIGS. 3E and 7G, or they can be used as a sacrificial material, such that only conventional materials remain in the finished capacitor, as shown in the embodiment of FIG. 5F. The nanofibers for example have a diameter of between 5 and 50 nm, depending on the particular embodiment and required capacitive surface area of the device.

In the case of a MIM capacitor according to the present invention in which the nanofibers remains in the capacitor after fabrication, if the nanofibers are conductive and no metallic barrier 324 is deposited, then the protrusion widths will equal that of the nanofibers. However, if a metallic barrier 324 is provided, the width of the protrusions will then be equal to the diameter of the nanofibers plus twice the metallic barrier thickness. However, the metallic barrier for example has a relatively insignificant thickness of less than 2 nm, and thus total width of the protrusion is for example between approximately 5 and 100 nm, and more preferably between 5 and 50 nm.

On the other hand, if the nanofibers are used as a sacrificial material, then the protrusion width will be the diameter of the nanofibers, minus twice the thickness of the dielectric layer. In this embodiment, due to the thickness of the dielectric layer, which is for example between 1 and 30 nm thick, the carbon nanofiber is preferably grown to a diameter of between 10 nm and 100 nm, and the width of the protrusion is for example between 10 nm and 40 nm.

Due to the increased capacitive surface area, MIM capacitors described above show an improved capacitance per unit area. For example, with a carbon nanofiber height of 200 nm, a dielectric material of 30 nm in thickness, top and bottom plate heights of 300 nm and a density of nanofibers having one unit area of carbon nanofiber for every nine possible unit areas, the embodiment of FIG. 3E can be shown to have a capacitive surface area 650 percent higher than a standard 3D MIM capacitor, and has been shown by simulation to achieve a capacitance equal to between 6 and 35 fF/$\mu m^2$. MIM capacitors according to the embodiment of FIG. 5F or FIG. 7G, having the same dimensions, but having a carbon nanofiber height of 300 nm, can have an increase in capacitive surface area when compared to a similar standard 2D MIM capacitor of 960 percent, and have been shown by simulation to have a capacitance of between 9 and 50 fF/$\mu m^2$.

Having thus described at least one illustrative embodiment of the invention, various alterations, modifications and improvements will readily occur to those skilled in the art. Such alterations, modifications and improvements are intended to be within the scope of the invention.

For example, while the example of copper for forming the top and bottom electrodes has been provided, in alternative embodiments other conducting materials could be used. Furthermore, the metallic barriers for forming the capacitor plates could be formed of a variety of materials. For example the electrodes and/or metal barriers could comprise one of tungsten (W), titanium nitride (TiN), tantalum nitride (TaN), tungsten carbon nitride (WCN) or ruthenium (Ru). Furthermore, a variety of materials are possible for the dielectric layer 326, 530 between the top and bottom plates, and for example this layer could comprise one or more of silicon dioxide ($SiO_2$), silicon nitride ($SiN_4$), tantalum oxide ($Ta_2O_5$), aluminum oxide ($Al_2O_3$), hafnium oxide ($HfO_2$), zirconium oxide ($ZrO_2$), BST (barium strontium titanate) oxide, or PZT (lead zirconate titanate). A multilayer structure could be used comprising layers of any of the above materials, for example comprising layers of $Ta_2U_5$ sandwiched between two layers of $HfO_2$. Other conducting materials could be used to form the capacitor plates/electrodes, and alternative insulating materials could be used to form the dielectric layer.

In alternative embodiments, layer 312 in FIG. 3A that provided for growth of nanofibers could be replaced by a layer of a similar material deposited at the bottom of trench 318 once the silicon layer 316 has already been deposited. The layer is for example a cobalt or nickel based electroless barrier. In this case, the no self aligned barrier 314 is provided over line 304. Generally, a base surface provided for carbon nanofiber growth could be formed of any suitable material.

While photolithography steps using a hard mask have been described in the various embodiments for forming trenches in the insulating layers, other techniques may be used.

With reference to FIG. 7B, after growth of the nanofibers 716, in alternative embodiments the sacrificial layer 708 can be removed, and the steps as described in relation to FIGS. 5B to 5F can be performed to provide a 3D MIM capacitor with no nanofibers remaining.

Particular examples of carbon nanofiber growth have been provided above, but there are other materials, processes or techniques that could be used to form these nanofibers. For example silicon nanofibers could be used instead of carbon nanofibers. It is only necessary that these nanofibers are grown to have dimensions that provide the required capacitive surface area between the electrodes of the capacitor. Nanofibers can be grown on a suitable material comprising nickel or cobalt particles such as one or a combination of CoWP, CoWB, CoWPB and NiMoP, or catalytic particles of nickel or cobalt can be applied to a suitable base layer, formed for example of copper or another suitable material, on which nanofibers can be grown.

MIM capacitors according to the present invention can be implemented in circuits for a very wide range of applications in which a capacitor having a high capacitance per unit area is required. For example, capacitors according to the embodiments of the present invention described herein can be used as decoupling capacitors, linking capacitors used as filters between two blocks, capacitors in memories such as DRAM, analog applications such as voltage controlled oscillators, or in radio frequency applications such as in frequency filters. Devices comprising a circuit in which such a capacitor could be of use include for example mobile telephones, computers, digital media players such as DVD players, etc.

Having thus described at least one illustrative embodiment of the invention, various alterations, modification, and improvements will readily occur to those skilled in the art. Such alterations, modifications, and improvements are intended to be within the spirit and scope of the invention. Accordingly, the foregoing description is by way of example only and is not intended as limiting.

The invention is limited only as defined in the following claims and the equivalents thereto.

What is claimed is:

1. A method of forming a metal-insulator-metal capacitor having top and bottom plates separated by a dielectric layer, one of said top and bottom plates having a form comprising at least one protrusion extending into a corresponding cavity in the other of said top and bottom plates, the method comprising:
    growing at least one nanofiber on a base surface; and
    forming one of said top and bottom plates such that the diameter of said at least one protrusion is determined by the diameter of said at least one nanofiber by coating said at least one nanofiber with a metallic layer and subsequently coating said metallic layer with a dielectric layer, wherein said at least one protrusion comprises one of said nanofibers.

2. The method of claim 1, wherein said nanofiber is a carbon nanofiber and said base surface comprises at least one of nickel and cobalt.

3. The method of claim 1, wherein said nanofibers comprise carbon nanofibers.

4. The method of claim 1, wherein said nanofibers are grown to have a diameter of less than 50 nm.

5. The method of claim 1, wherein said protrusions have a diameter of less than 40 nm.

6. A method of forming a metal-insulator-metal capacitor having top and bottom plates separated by a dielectric layer, one of said top and bottom plates having a form comprising at least one protrusion extending into a corresponding cavity in the other of said top and bottom plates, the method comprising:
    growing at least one nanofiber on a base surface; and
    forming one of said top and bottom plates such that the diameter of said at least one protrusion is determined by the diameter of said at least one nanofiber by depositing a first layer of a material over said surface, selectively removing said at least one nanofiber such that at least one hole remains in said first layer, and forming said at least one protrusion in said at least one hole.

7. The method of claim 6, wherein said holes have a diameter of less than 50 nm.

8. The method of claim 6, wherein said first layer is of a conducting material, and wherein said at least one nanofiber is removed using an etch.

9. A method of forming a metal-insulator-metal capacitor having top and bottom plates separated by a dielectric layer, one of said top and bottom plates having a form comprising at least one protrusion extending into a corresponding cavity in the other of said top and bottom plates, the method comprising: depositing catalytic particles over a base surface, said particles providing a starting point subsequent nanofiber growth; growing at least one nanofiber on said base surface; and forming one of said top and bottom plates such that the diameter of said at least one protrusion is determined by the diameter of said at least one nanofiber.

10. A method of forming a metal-insulator-metal capacitor having top and bottom plates separated by a dielectric layer, one of said top and bottom plates having a form comprising at least one protrusion extending into a corresponding cavity in the other of said top and bottom plates, the method comprising: depositing a layer of sacrificial material over a base surface, and etching a plurality of holes in said sacrificial material down to said base surface, growing at least one nanofiber on said base surface; and forming one of said top and bottom plates such that the diameter of said at least one protrusion is determined by the diameter of said at least one nanofiber, said nanofibers being grown on said base surface in said plurality of holes.

* * * * *